United States Patent
Anastasijevic et al.

(10) Patent No.: US 8,876,969 B2
(45) Date of Patent: Nov. 4, 2014

(54) PROCESS AND PLANT FOR LOWERING THE RESIDUAL CARBON CONTENT OF ASH

(75) Inventors: Nikola Anastasijevic, Altenstadt (DE); Guenter Schneider, Lorsch (DE)

(73) Assignee: Outotec Oyj, Espoo (FI)

(*) Notice: Subject to any disclaimer, the term of this patent is extended or adjusted under 35 U.S.C. 154(b) by 63 days.

(21) Appl. No.: 13/700,736

(22) PCT Filed: May 30, 2011

(86) PCT No.: PCT/EP2011/058856
§ 371 (c)(1), (2), (4) Date: Nov. 29, 2012

(87) PCT Pub. No.: WO2011/151294
PCT Pub. Date: Dec. 8, 2011

(65) Prior Publication Data
US 2013/0068138 A1    Mar. 21, 2013

(30) Foreign Application Priority Data
Jun. 1, 2010   (DE) .......................... 10 2010 022 400

(51) Int. Cl.
| | | |
|---|---|---|
| *C04B 18/06* | (2006.01) | |
| *C04B 18/08* | (2006.01) | |
| *B01J 8/24* | (2006.01) | |
| *F23C 10/12* | (2006.01) | |
| *F23G 5/46* | (2006.01) | |
| *F23G 5/30* | (2006.01) | |
| *C09C 1/44* | (2006.01) | |
| *B01J 8/42* | (2006.01) | |

(52) U.S. Cl.
CPC .............. *C09C 1/44* (2013.01); *F23G 2209/30* (2013.01); *B01J 8/24* (2013.01); *F23C 10/12* (2013.01); *F23G 2204/203* (2013.01); *F23G 5/46* (2013.01); *F23G 5/30* (2013.01); *B01J 8/42* (2013.01); *Y10S 106/01* (2013.01)
USPC ...... 106/705; 106/DIG. 1; 422/144; 423/461; 219/678; 219/682; 110/165 R; 110/344

(58) Field of Classification Search
CPC .. F23G 2204/203; F23G 2209/30; B01J 8/24; B01J 8/42; C09C 1/44; C04B 18/06; C04B 18/08; C01B 31/02; H05B 6/64; F23C 10/24; F23C 10/00; F23J 1/00; F27B 15/00
USPC .............. 106/705, DIG. 1; 423/461; 219/678; 219/682; 110/165 R, 344; 432/58
See application file for complete search history.

(56) References Cited

U.S. PATENT DOCUMENTS 4,021,193 A * 5/1977 Waters ............................ 432/58
4,663,507 A * 5/1987 Trerice .......................... 219/694

(Continued)

FOREIGN PATENT DOCUMENTS

DE   10260745 A1   7/2004
EP   0521059 A1   1/1993

(Continued)

OTHER PUBLICATIONS

European Patent Office, International Search Report in International Patent Application No. PCT/EP2011/058856 (Aug. 29, 2011).

*Primary Examiner* — Paul Marcantoni
(74) *Attorney, Agent, or Firm* — Leydig, Voit & Mayer, Ltd.

(57) ABSTRACT

A process for lowering the carbon content in ash includes introducing the ash having a carbon content of 1 to 20 wt-% into a reactor where the ash is burnt at a temperature between 700 and 1100° C. Fuel is also introduced into the reactor. During combustion, microwave radiation is fed into the reactor. At least part of the energy released during the combustion is recovered.

10 Claims, 3 Drawing Sheets

(56) References Cited

U.S. PATENT DOCUMENTS

| | | | |
|---|---|---|---|
| 4,705,409 A * | 11/1987 | Trerice | 374/45 |
| 5,160,539 A * | 11/1992 | Cochran | 106/405 |
| 5,399,194 A * | 3/1995 | Cochran et al. | 106/405 |
| 5,484,476 A * | 1/1996 | Boyd | 106/405 |
| 5,868,084 A * | 2/1999 | Bachik | 110/257 |
| 6,202,573 B1 * | 3/2001 | Bachik | 110/165 A |
| 6,457,425 B1 * | 10/2002 | Crafton et al. | 110/346 |
| 7,214,254 B2 | 5/2007 | Tranquilla | |
| 8,234,986 B2 * | 8/2012 | Knowles et al. | 110/344 |
| 8,716,637 B2 * | 5/2014 | Ripley et al. | 219/679 |
| 2002/0189497 A1 * | 12/2002 | Tranquilla | 106/405 |
| 2005/0160667 A1 | 7/2005 | Weinberg et al. | |
| 2006/0266636 A1 | 11/2006 | Stroder et al. | |
| 2007/0045299 A1 * | 3/2007 | Tranquilla | 219/694 |
| 2009/0314185 A1 | 12/2009 | Whellock | |

FOREIGN PATENT DOCUMENTS

| | | |
|---|---|---|
| JP | 7265834 A | 10/1995 |
| WO | WO 9808989 A1 | 3/1998 |
| WO | WO 02097330 A1 | 12/2002 |
| WO | WO 2004056468 A1 | 7/2004 |

* cited by examiner

PROCESS AND PLANT FOR LOWERING THE RESIDUAL CARBON CONTENT OF ASH

CROSS-REFERENCE TO PRIOR APPLICATIONS

This application is a U.S. National Phase application under 35 U.S.C. §371 of International Application No. PCT/EP2011/058856, filed on May 30, 2011, and claims benefit to German Patent Application No. DE 10 2010 022 400.6, filed on Jun. 1, 2010. The International Application was published in English on Dec. 8, 2011 as WO 2011/151294 under PCT Article 21(2).

FIELD

The present invention relates to a process and a plant for lowering the residual carbon content in ash, preferably in coal ash, in which ash with a carbon content of 1 to 20 wt-% is introduced into a reactor, in particular a fluidized-bed reactor, and is burnt at temperatures of 700 to 1100° C., preferably 750 to 900° C.

BACKGROUND

The residues of organic material produced during combustions are referred to as ash. The composition of ash particles greatly depends on the combustible material and extends from residual carbon and minerals (quartz) over metallic compounds (mostly oxides and (bi-) carbonates, such as $Al_2O_3$, CaO, $Fe_2O_3$, MgO, MnO, $P_2O_5$, $K_2O$, $SiO_2$, $Na_2CO_3$, $NaHCO_3$) up to toxic substances, such as heavy metals (e.g. arsenic and zinc) and dioxins. The residual carbon contained in the ash with an amount of up to 20 wt-% for the most part is centered in a coal core, which is surrounded by metal oxide compounds. Such ashes are not suitable for simple dumping, but must be declared as hazardous waste, since they are hygroscopic and with improper dumping the soluble components leached out thus can get into the groundwater. This form of ash is not usable either as filler in the cement industry, because the residual carbon content deteriorates the binding properties.

The problem of the residual carbon content in ash, in particular that of the fly ash obtained in coal-fired power plants with a bulk density of 0.9 to 1.1 kg/l, is known just as experiments to penetrate the metal oxides protectively enveloping the carbon core with microwave radiation. EP 0 521 059 B1 for example describes a method for determining the carbon content in fly ash. For this purpose, an ash sample is collected in a measuring chamber which acts as microwave resonance space, and the sample is exposed to a microwave radiation. By measurements of the absorption of sample and reference materials, the dielectric constant of the sample material can be determined and thus ultimately be used to estimate the residual carbon content.

U.S. Pat. No. 4,705,409 likewise describes the use of microwave radiation in conjunction with the determination of the carbon content in fly ash. For this purpose, the fly ash is exposed to a microwave radiation for absorbance measurement. Part of microwave radiation is absorbed hereby by carbon, the rest of the radiation is absorbed in an absorption fluid. From the difference of the temperature of this absorption fluid in measurements with and without ash sample the carbon content can be inferred. Due to the absorption of the microwave radiation, a partial reduction of the carbon content in the fly ash can occur, which requires, however, a comparatively high radiation energy.

A process for the thermal treatment of granular solids, in particular for roasting ores, in a reactor with fluidized bed in which microwave radiation from a microwave source is fed into the reactor, is known for example from DE 102 60 745 A1. To improve the utilization of energy and the feeding of the microwave radiation, a gas or gas mixture is introduced into a mixing chamber of the reactor from below through a central supply tube, wherein the gas supply tube is at least partly surrounded by a stationary annular fluidized bed fluidized by supplying fluidizing gas. The feeding of the microwaves is effected through the central gas supply tube.

SUMMARY

In an embodiment, the present invention provides a process for lowering the carbon content in ash. The ash, having a carbon content of 1 to 20 wt-%, is introduced into a reactor where the ash is burnt at a temperature between 700 and 1100° C. Fuel is also introduced into the reactor. During combustion, microwave radiation is fed into the reactor. At least part of the energy released during the combustion is recovered.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
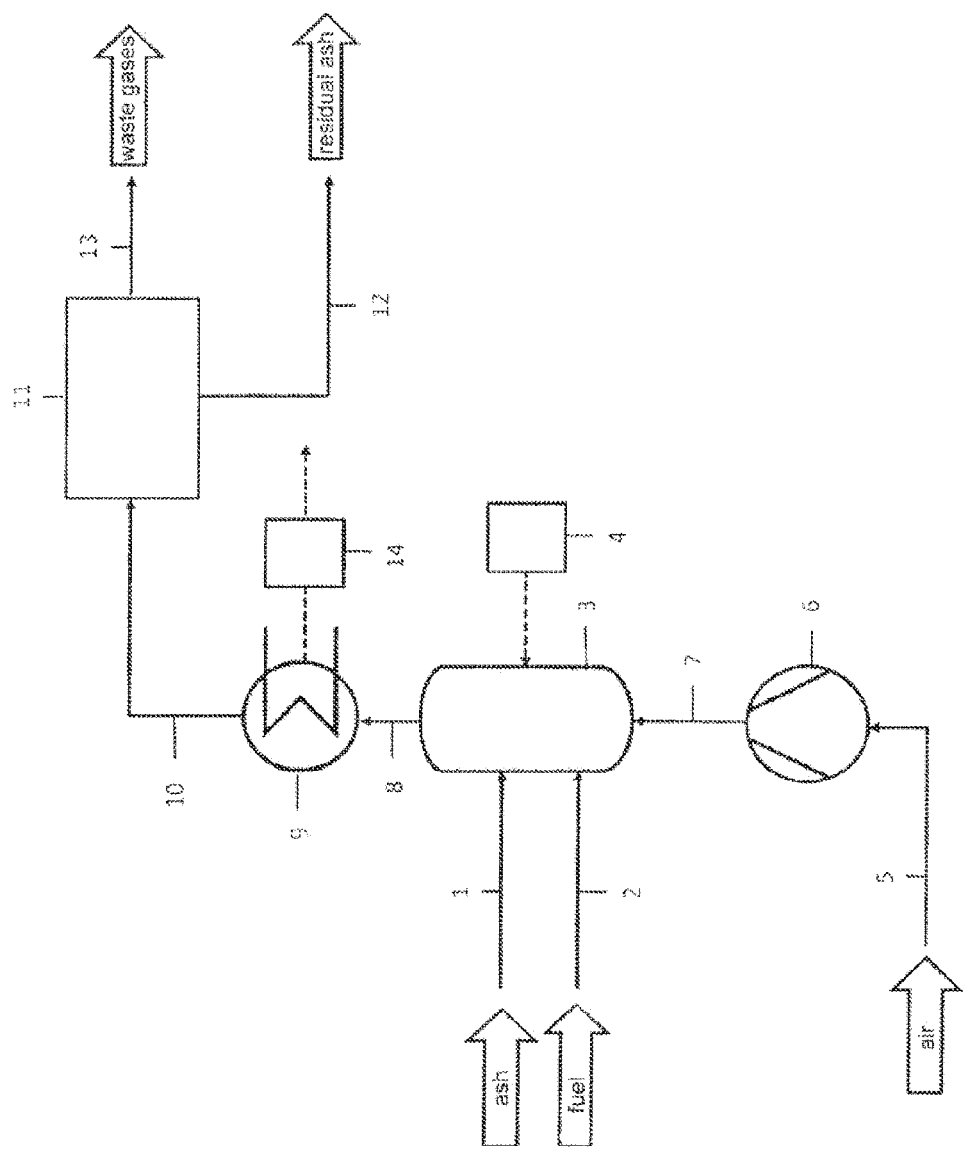
FIG. 1 shows a process diagram of a process and a plant in accordance with a first embodiment of the present invention.

In an embodiment, the present invention provides to completely combust in an efficient way the residual carbon of the ash and at the same time provide a procedure which is as efficient as possible in energetic terms.

In an embodiment, the ash with a carbon content of 1 to 20 wt-% is introduced into a reactor and burnt there at temperatures of 700 to 1100° C., preferably 750 to 900° C., wherein during the combustion microwave radiation is fed into the reactor and the energy released during the combustion is at least partly recovered. Here, the use of a fluidized-bed reactor is advantageous above all, as in this way a particularly high amount of the ash surface can be reached by the microwave radiation per unit time. Due to the irradiation with microwaves, the residual carbon in the ash can be preferably heated which results in a improved combustion rate. The energy released by combustion of the residual carbon is partly recovered later. The combustion temperature is maintained at ~800° C. by feeding in the corresponding amount of air or additional fuel. Under adiabatic conditions the temperature increase $\Delta T$ can be expressed as a non-linear function to the residual carbon content, according to which with 1 wt-% of carbon in the fly ash the temperature increase per weight percent of carbon is ~290° C., with 5 wt-% of carbon the temperature increase per weight percent of carbon is ~170° C., and with 10 wt-% of carbon the temperature increase per weight percent of carbon is ~120° C. (assumptions: $SiO_2$ major mineral component of ash and oxygen content of the off-gas in the range of 1.7 to 1.8%). Thus, the ash can not only be converted to a material suitable for dumping or even usable in the cement industry, but the carbon content can also be utilized for recovering energy.

After the combustion, the residual carbon content of the remaining ash residues is below 0.1 wt-%, preferably not more than 0.01 wt-%.

In a preferred aspect of the invention, the ash is charged into the reactor with a temperature of at least 100° C., preferably at least 120° C., particularly preferably 150° C. to 300° C., as in this way less additional energy must be supplied for the combustion process. In particular, it was found to be favorable that directly after its production, e.g. in a coal-fired power plant, the ash is subjected to the process of an embodiment of the invention. That would allow a direct processing of preheated dry ash.

Otherwise, the ash which above all after being dumped temporarily can have a residual water content of up to 20 wt-%, in particular of up to 15 wt-%, can be supplied to a drying means provided upstream of the reactor. In this drying means, the ash is preheated to a temperature of at least 100° C., preferably at least 120° C., particularly preferably 150° C. to 300° C., wherein at the same time water contained in the ash is evaporated due to such heating. Due to such pretreatment it is possible to reduce the amount of energy to be introduced into the reactor.

In a preferred embodiment of the invention, the water obtained during drying is supplied to a steam generator as condensate and at least parts of this steam are again recirculated into the drying means as energy carrier. Due to this cycle inside the drying stage energy losses can be minimized.

One aspect of the energy recovery in accordance with an embodiment of the invention provides that the energy released in the reactor is at least partly utilized for steam generation. When the process includes a drying means, it is recommendable in particular to at least partly use the energy released during the combustion for evaporating the condensate obtained during drying in the steam generator and to again supply the steam thus obtained to the drying means. Downstream of the steam generation further units can be provided for energy recovery.

Furthermore, the introduction of additional fuel, in particular coal, into the reactor is possible in accordance with an embodiment of the invention. As a result, the combustion temperature can be kept constant in the particularly favorable range of 750 to 900° C. In addition, it is not necessary that the entire input of energy is effected by the microwave radiation. The use of coal as fuel is recommendable in particular when the process of an embodiment of the invention is performed downstream of a coal-fired power plant and coal thus is easily available.

To optimize the mass and heat transfer, it is favorable to introduce a gas or a gas mixture from below through a preferably central gas supply tube (central tube or central tuyère) into a mixing chamber of the reactor, wherein the gas supply tube is at least partly surrounded by a stationary annular fluidized bed of the ash which is fluidized by supplying fluidizing gas, and the microwave radiation is guided through the same gas supply tube into the mixing chamber. The gas introduced through the gas supply tube and/or the fluidizing gas contains the oxygen required for the combustion.

A plant in accordance with an embodiment of the invention, which is suitable in particular for performing the process described above, includes a reactor formed as fluidized-bed reactor for the heat treatment of the ash, and a microwave source. To the reactor a gas supply system furthermore is connected, which is formed such that the gas flowing through the gas supply system entrains solids from the stationary annular fluidized bed of the ash into a mixing chamber of the reactor, wherein the microwave radiation generated by the microwave source can be fed in through the gas supply system. At the same time, a fuel conduit for introducing fuel opens into the reactor. Finally, the plant also includes a unit for heat recovery provided downstream of the reactor.

An improvement of the plant is obtained when upstream of the reactor a drying means is provided, which is operated in a cycle with steam from a steam generator. In this cycle, the condensate obtained in the drying means is introduced through a conduit into the steam generator, where by feeding in energy, preferably that energy which is obtained during the combustion in the reactor, it is converted into steam and as such passed back into the drying means.

FIG. 1 shows a process without predrying stage in accordance with a first embodiment of the invention. Via a conduit 1, dry ash with a temperature of e.g. 250° C. and a mass flow of e.g. 10 t/h is supplied to a combustion reactor 3. At the same time, coal is introduced into the reactor 3 via a conduit 2 as further fuel with ambient temperature (e.g. 25° C.). In principle, other fuels can also be used here, such as Diesel, gasoline or gas.

Via a microwave source 4, the reactor 3 is charged with electromagnetic waves (microwaves), wherein different wavelengths can be set. Suitable microwave sources include e.g. a magnetron or a klystron. Furthermore, high-frequency generators with corresponding coils or power transistors can be used. The frequencies of the electromagnetic waves emitted by the microwave source usually lie in the range from 300 MHz to 30 GHz. Preferably, the ISM frequencies 435 MHz, 915 MHz and 2.45 GHz are used.

The combustion in the reactor 3 is effected at 700 to 1100° C., preferably 750 to 900° C. As oxygen source, the air compressed in a compressor 6 is injected into the reactor 3 via conduits 5 and 7. If the reactor constitutes a fluidized-bed reactor, the gas containing oxygen can be used as fluidizing gas and/or be fed in separately. The utilization of air as oxygen carrier is particularly favorable, as it can be withdrawn from the surrounding atmosphere without additional costs. In principle, however, pure oxygen can be used just as any gas mixture containing oxygen. Compression is not absolutely necessary either.

Via conduit 8, the hot combustion residues and gases of e.g. 800° C. are delivered into an energy recovery 9. This energy recovery 9 can be e.g. a unit for steam generation, wherein the steam then is utilized for generating electric energy by means of a steam turbine. If the plant of an embodiment of the invention is provided downstream of a power plant, this steam can also be admixed to the steam flow obtained in actual operation of the power plant.

From the energy recovery 9 the combustion residues and waste gases with a temperature of e.g. 250° C. are transferred via a conduit 10 into a cyclone 11, in which ash is separated from waste gases. For separating the solids from the waste gases, however, other separating means such as a filter are also possible. The residual ash is withdrawn from the process via conduit 12, while the waste gases are discharged from the cyclone via conduit 13.

Figure 2:
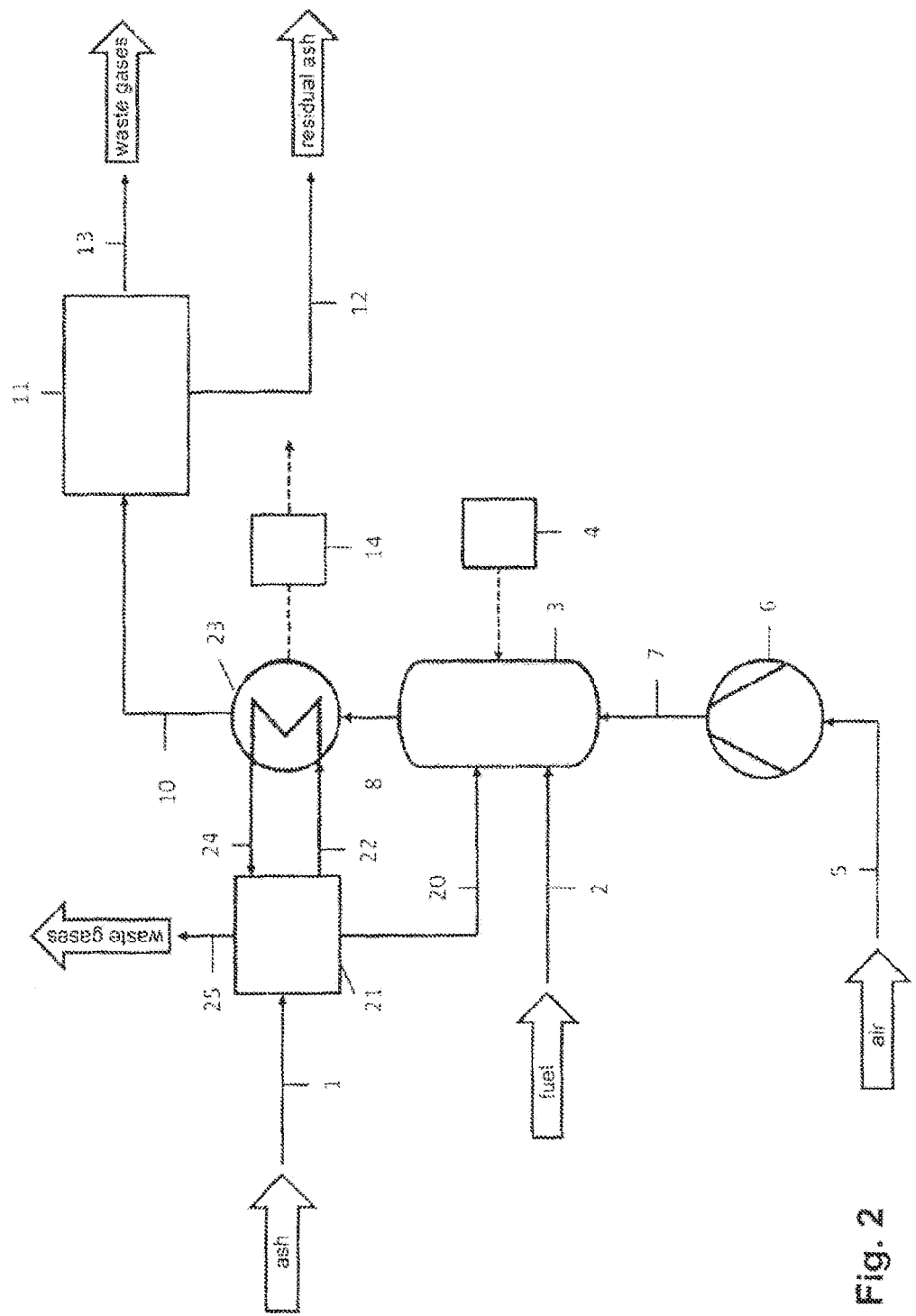
FIG. 2 shows a process diagram of a process and a plant in accordance with a second embodiment of the present invention.

FIG. 2 shows the process of an embodiment of the invention and the associated plant with an upstream means for drying the ash. For this purpose, the ash with a residual water content of 15% is charged into a drier 21 via conduit 1. Via a conduit 22, the condensate obtained in the drier 21 is supplied to a steam generator 23, from which it can again be supplied as energy carrier to the drying stage 21 via conduit 24. Waste gases from the drying stage 21 are discharged via conduit 25. Via conduit 20, the dried ash then is supplied to the combustion reactor 3 with a temperature of e.g. 110° C. and a mass flow of e.g. 10 t/h.

Via conduit 2, coal with an ambient temperature of 25° C. at the same time is introduced into the reactor 3 as further fuel. Here as well, air with a temperature of e.g. 25° C. serves as oxygen source. Via the microwave source 4, microwave radiation additionally is introduced into the reactor 3, in order to activate the carbon core of the ash and make it accessible to the combustion. Due to the combustion in accordance with an embodiment of the invention, the residual carbon content of the ash can be lowered down to 0.1 wt-% or even 0.01 wt-% in this embodiment as also in the first embodiment.

The hot residues and waste gases with a temperature of about 800° C. are supplied via conduit 8 to the steam generator 23, in which the condensate from the drying stage 21 is converted into steam. With an excess amount, further steam can be withdrawn from the steam generator 23 for energy utilization. As a result, it often is required to introduce additional water either into the steam generation itself or into the supply conduit 22 via a conduit. In principle, it is also possible to utilize only a part of the energy generated by the combustion in the steam generator 23 and provide at least one further downstream, energy generation stage.

After the last energy generation stage, which in FIG. 2 is the steam generation 23, the gas/solids mixture is delivered into the cyclone 11 for separation, where the ash now almost liberated from carbon is separated from the hot waste gases with a temperature of still e.g. 250° C.

Figure 3:
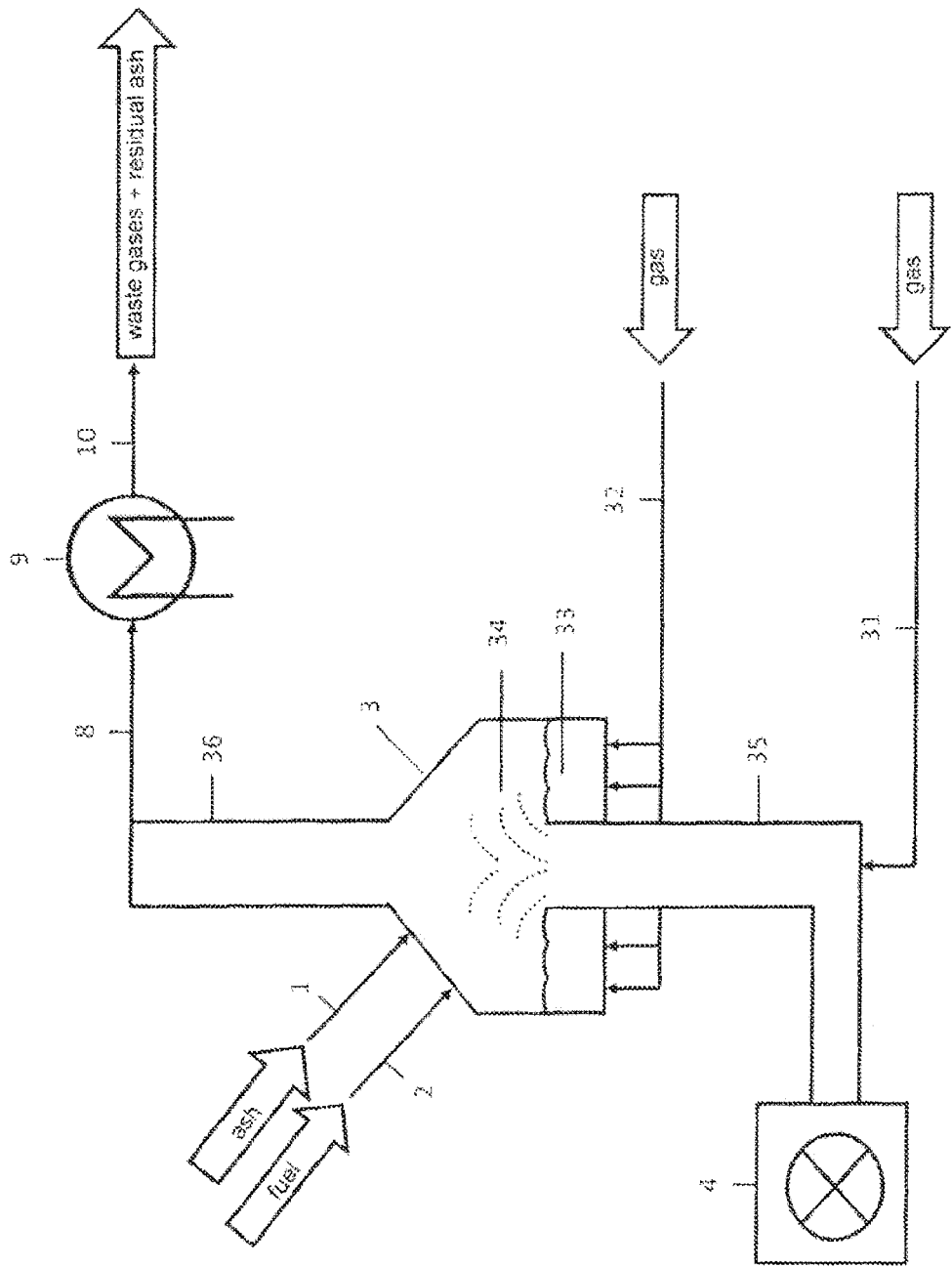
FIG. 3 schematically shows the configuration of a plant in accordance with an embodiment of the invention.

FIG. 3 shows the configuration of a plant of an embodiment of the invention with the claimed design of the reactor 3, into whose e.g. cylindrical body a central tube 35 opens such that it extends substantially vertically upwards from the bottom of the reactor 3. In the region of the bottom of the reactor 3 a gas distributor is provided, into which a supply conduit 32 for fluidizing gas opens. In the vertically upper region of the reactor 3, which forms a mixing chamber 34, an outlet 36 is arranged, which via conduit 8 opens into the unit for energy recovery 9. From this unit 9, both the waste gas and the particles contained therein are transferred via conduit 10 into the separating means 11. At the end of the central tube 35 opposite to the reactor 3 a microwave source 4 is arranged. The microwave rays produced there are introduced into the mixing chamber 34 via the central tube 35.

Via the solids conduit 1 the ash is introduced into the reactor 3 and forms a layer 33 annularly surrounding the central tube 35 above the bottom of the reactor 3. This annular fluidized bed 33 is fluidized by the gas introduced via conduit 32 such that a stationary fluidized bed is formed. The velocity of the gases supplied to the reactor 3 preferably is adjusted such that the Particle Froude Number in the annular fluidized bed 33 lies between about 0.115 and 1.15. The Particle Froude Number is defined as:

$$Fr_P = \frac{u}{\sqrt{\frac{(\rho_s - \rho_f)}{\rho_f} * d_p * g}}$$

with
u=effective velocity of the gas flow in m/s
$\rho_s$=density of the solid particles in kg/m³
$\rho_f$=effective density of the fluidizing gas in kg/m³
$d_p$=mean diameter in m of the particles of the reactor inventory present during operation of the reactor (or of the particles formed)
g=gravitational constant in m/s².

The height level of the annular fluidized bed is adjusted such that solids get over the edge of the central tube 35 and thus are entrained into the mixing chamber 34 by the gas flowing through the central tube 35. The velocity of the gas supplied to the reactor 3 through the central tube 35 preferably is adjusted such that the Particle Froude Number in the central tube 35 lies between about 1.15 and 20 and in the mixing chamber 7 between about 0.37 and 3.7.

Via conduit 2, further fuel is also introduced into the reactor 3. In the case of liquid or gaseous fuel, the same preferably is injected such that a uniform distribution is obtained over the entire mixing chamber 34. If the fuel is present in solid form, the solids become part of the annular fluidized bed 33, which is why fuel and ash must be introduced into the reactor 3 in the desired quantity ratio for adjusting the required solids level of the annular fluidized bed chamber 33.

EXAMPLE 1

The following Table 1 represents the mass flows obtained by simulation as well as energy inputs and outputs of a process as it is shown in FIG. 1.

TABLE 1

| C of dry ash wt-% | V (air) Nm³/h | V (waste gas) Nm³/h | M (coal) t/h | Microwaves MW | M (ash) t/h | Recovered energy MW | O₂ (waste gas) mol-% |
|---|---|---|---|---|---|---|---|
| 1.0 | 2694 | 2906 | 0.40 | 0.139 | 10.0 | 2.4 | 3.0 |
| 2.0 | 2666 | 2794 | 0.24 | 0.142 | 9.9 | 2.3 | 3.0 |
| 3.0 | 2638 | 2681 | 0.08 | 0.144 | 9.8 | 2.3 | 3.0 |
| 4.0 | 4275 | 4275 | 0.00 | 0.166 | 9.7 | 2.6 | 7.7 |
| 5.0 | 7558 | 7558 | 0.00 | 0.207 | 9.6 | 3.3 | 11.0 |
| 6.0 | 10841 | 10841 | 0.00 | 0.249 | 9.5 | 4.0 | 12.2 |
| 7.0 | 14125 | 14125 | 0.00 | 0.290 | 9.4 | 4.8 | 12.9 |
| 8.0 | 17408 | 17408 | 0.00 | 0.332 | 9.3 | 5.5 | 13.4 |
| 9.0 | 20691 | 20691 | 0.00 | 0.373 | 9.2 | 6.2 | 13.6 |
| 10.0 | 23974 | 23974 | 0.00 | 0.415 | 9.1 | 6.9 | 13.9 |

The process simulation underlying Table 1 proceeds from a mass flow of the ash of 10 t/h at a temperature of 250° C. Air and coal both have a temperature of 25° C. The exit temperature from the reactor is 800° C., the final waste gas temperature is 250° C.

Table 1 correlates the carbon content of the dry ash (column 1) with the volume flow of the air injected into the reactor (column 2), the volume of the resulting waste gas (column 3), the used mass flow of the additional fuel coal (column 4), the microwave energy fed into the reactor 3 (column 5), the used mass flow of the dry ash (column 6), the energy obtained in the energy recovery (column 7), and the residual oxygen content in the waste gas (column 8).

The amount of converted air increases just like the resulting waste gases with the increase of the carbon content in the ash. From a carbon content of 4 wt-% the carbon content of the ash is so high that no further fuel must be supplied in the form of coal. The used microwave radiation hardly plays a role for the required amount of additional fuel.

It is found that due to an embodiment of the invention a considerable amount of energy becomes usable, which previously was lost unused along with the ash.

EXAMPLE 2

Example 2 refers to the simulation of a process as it is shown in FIG. 2. In Example 2, the simulation is based on a mass flow of the ash of 10 t/h at a temperature of 25° C. before drying (after drying 110° C.) and a water content of 15 wt-%. The ash has a residual carbon content of 15 to 25 wt-%. Air and coal both have a temperature of 25° C. The exit temperature from the reactor is 800° C., the final waste gas temperature is 250° C.

Table 2 represents the carbon content of the dry ash (column 1) with the volume flow of the air injected into the reactor (column 2), the volume of the resulting waste gas (column 3), the used mass flow of the additional fuel coal (column 4), the microwave energy fed into the reactor 3 (column 5), the used mass flow of the dry ash (column 6), the energy obtained in the energy recovery (column 7), and the residual oxygen content in the waste gas (column 8) in a process with integrated predrying of the ash:

TABLE 2

| C of dry ash wt-% | V (air) Nm³/h | V (waste gas) Nm³/h | M (coal) t/h | Microwaves MW | M (ash) t/h | Recovered energy MW | O₂ (waste gas) mol-% |
|---|---|---|---|---|---|---|---|
| 1.0 | 3287 | 3546 | 0.49 | 0.161 | 10.0 | 1.0 | 3.0 |
| 2.0 | 3261 | 3435 | 0.33 | 0.163 | 9.9 | 1.0 | 3.0 |
| 3.0 | 3234 | 3323 | 0.17 | 0.165 | 9.8 | 1.0 | 3.0 |
| 4.0 | 3208 | 3212 | 0.01 | 0.168 | 9.7 | 0.9 | 3.0 |
| 5.0 | 6321 | 6321 | 0.00 | 0.207 | 9.6 | 1.6 | 9.0 |
| 6.0 | 9603 | 9603 | 0.00 | 0.249 | 9.5 | 2.3 | 11.1 |
| 7.0 | 12883 | 12883 | 0.00 | 0.290 | 9.4 | 3.0 | 12.2 |
| 8.0 | 16163 | 16163 | 0.00 | 0.332 | 9.3 | 3.7 | 12.8 |
| 9.0 | 19444 | 19444 | 0.00 | 0.373 | 9.2 | 4.5 | 13.2 |
| 10.0 | 22725 | 22725 | 0.00 | 0.415 | 9.1 | 5.2 | 13.5 |

Table 2 confirms the results shown in Example 1, but in absolute terms the energy recovered is lower than in Example 1, since parts of the energy are used for evaporating the condensate in the drying stage. Due to the higher energy demand with a simultaneously lower inlet temperature of the ash (Example 1: 250° C., Example 2: 110° C.) it is only from a carbon content of at least 5 wt-% that no further fuel must be supplied in the form of coal.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

LIST OF REFERENCE NUMERALS 1 conduit
2 conduit
3 reactor
4 microwave source
5 conduit
6 compressor
7 conduit
8 conduit
9 unit for energy recovery
10 conduit
11 cyclone
12 conduit
13 conduit
20 conduit
21 predrying
22 conduit
23 steam generator
24 conduit
25 conduit
31 conduit
32 conduit
33 annular fluidized bed
34 mixing chamber
35 central tube
36 outlet

The invention claimed is:

1. A process for lowering the carbon content in ash, comprising:
    introducing the ash having a carbon content of 1 to 20 wt-% into a reactor where the ash is burnt at a temperature between 700 and 1100° C.;
    introducing fuel into the reactor;
    feeding, during combustion, microwave radiation into the reactor; and
    at least partially recovering energy released during the combustion.

2. The process according to claim 1, wherein the fuel is coal.

3. The process according to claim 1, wherein the combustion is performed such that a residual carbon content of the ash after the combustion is not more than 0.1 wt-%.

4. The process according to claim 1, wherein the ash is introduced with a temperature of at least 100° C.

5. The process according to claim 1, further comprising supplying the ash with a residual water content of up to 20 wt-% to a drying means provided upstream of the reactor.

6. The process according to claim 5, further comprising:
    supplying water obtained during drying in the drying means to a steam generator as condensate; and
    at least partially supplying steam obtained in the steam generator to the drying means as an energy carrier.

7. The process according to claim 1, further comprising at least partially utilizing the energy released in the reactor for steam generation.

8. The process according to claim 1, further comprising introducing a gas or a gas mixture into a mixing chamber of the reactor from below through at least one gas supply tube, the gas supply tube being at least partially surrounded by a stationary annular fluidized bed having the ash which is fluidized by supplying fluidizing gas, the microwave radiation being supplied to the mixing chamber through the gas supply tube.

9. A plant for lowering the carbon content in ash, comprising:

a reactor including a gas supply system configured to entrain the ash from a stationary annular fluidized bed, which at least partly surrounds the gas supply system, into a mixing chamber using gas flowing through the gas supply system;

a solids conduit configured to feed the ash into the reactor;

a microwave source configured to feed microwave radiation into the reactor through the gas supply system;

a fuel conduit configured to feed fuel into the reactor; and a unit configured to recover energy disposed downstream of the reactor.

10. The plant according to claim 9, further comprising a drying device disposed upstream of the reactor that is operable in a cycle with steam from a steam generator.

* * * * *